(12) United States Patent
Vasily et al.

(10) Patent No.: US 10,837,236 B1
(45) Date of Patent: Nov. 17, 2020

(54) TRENCHLESS PIPELINE INSTALLATION SYSTEM

(71) Applicants: Anishchenko Vasily, Buffalo Grove, IL (US); Philipp Suhm, Biberach an der Riß (DE); Atrushkevich Victor, Moscow (RU)

(72) Inventors: Anishchenko Vasily, Buffalo Grove, IL (US); Philipp Suhm, Biberach an der Riß (DE); Atrushkevich Victor, Moscow (RU)

( * ) Notice: Subject to any disclaimer, the term of this patent is extended or adjusted under 35 U.S.C. 154(b) by 0 days.

(21) Appl. No.: 16/876,698

(22) Filed: May 18, 2020

Related U.S. Application Data (60) Provisional application No. 62/858,061, filed on Jun. 6, 2019.

(51) Int. Cl.
*F16L 1/028* (2006.01)
*E21B 7/20* (2006.01)
*E21B 7/18* (2006.01)

(52) U.S. Cl.
CPC ............... *E21B 7/206* (2013.01); *E21B 7/18* (2013.01); *F16L 1/028* (2013.01)

(58) Field of Classification Search
CPC ............ E21B 7/046; F16L 1/028; F16L 1/032
See application file for complete search history.

(56) References Cited

U.S. PATENT DOCUMENTS

| | | | | | |
|---|---|---|---|---|---|
| 2,383,496 | A | * | 8/1945 | Nebolsine | E21B 7/06 175/62 |
| 4,121,673 | A | * | 10/1978 | Cherrington | E21B 7/046 175/61 |
| 5,067,854 | A | * | 11/1991 | Sweeney | E21B 7/20 405/184 |
| 5,096,002 | A | * | 3/1992 | Cherrington | E21B 7/20 175/53 |
| 5,209,605 | A | * | 5/1993 | Cherrington | E21B 21/12 405/129.85 |
| 5,269,384 | A | * | 12/1993 | Cherrington | E21B 7/28 175/102 |
| 5,628,585 | A | * | 5/1997 | Parish, II | E03F 3/06 175/53 |
| 5,775,841 | A | * | 7/1998 | Pajunen | E21B 7/26 138/97 |
| 6,109,828 | A | * | 8/2000 | Keller | B29C 63/36 175/53 |
| 6,315,498 | B1 | * | 11/2001 | Baugh | E21B 4/18 166/383 |
| 7,279,052 | B2 | * | 10/2007 | Kinnari | F16L 55/38 134/8 |
| 7,367,748 | B2 | * | 5/2008 | Groebner | E21B 7/20 166/250.01 |

(Continued)

*Primary Examiner* — Benjamin F Fiorello
(74) *Attorney, Agent, or Firm* — Justin Lampel (57) ABSTRACT

A trenchless pipeline installation system and method are provided. The system and method may utilize a venturi pipe system located behind a drill bit and a pipe pushing device to help pull a pipe/cable underground in a continuous one-step process. The system combines a pipe casing, venturi system, mud motor and drill bit in a single, compressed system with a small diameter. The system is especially suitable for allowing a one-step installation of smaller-diameter pipe or cable line under, for example, rivers, hills, ravines, roads, railroads, streets, agricultural and residential areas.

18 Claims, 10 Drawing Sheets

(56) References Cited

U.S. PATENT DOCUMENTS

| | | | | |
|---|---|---|---|---|
| 7,654,774 B1* | 2/2010 | Jarred | ............. | F16L 1/032 |
| | | | | 405/184 |
| 8,221,032 B2* | 7/2012 | Desmeules | ............. | E02F 3/966 |
| | | | | 405/184.4 |
| 8,529,156 B2* | 9/2013 | Biggs | ............. | F24T 10/10 |
| | | | | 405/184 |
| 8,684,095 B2* | 4/2014 | Pullman | ............. | E21B 7/20 |
| | | | | 166/381 |
| 9,188,368 B2* | 11/2015 | Desmeules | ............. | E21B 7/20 |
| 2008/0050180 A1* | 2/2008 | Baugh | ............. | E21B 21/08 |
| | | | | 405/184 |
| 2008/0124178 A1* | 5/2008 | Rohde | ............. | E21B 7/046 |
| | | | | 405/184.5 |
| 2011/0164925 A1* | 7/2011 | Schauerte | ............. | H02G 1/06 |
| | | | | 405/184 |
| 2011/0280664 A1* | 11/2011 | Rohde | ............. | E21B 17/076 |
| | | | | 405/184 |
| 2011/0311313 A1* | 12/2011 | Pajunen | ............. | F16L 1/028 |
| | | | | 405/183 |
| 2013/0264120 A1* | 10/2013 | Zhou | ............. | E21B 7/064 |
| | | | | 175/61 |
| 2013/0330129 A1* | 12/2013 | Huck | ............. | F24T 10/10 |
| | | | | 405/179 |
| 2014/0255103 A1* | 9/2014 | Crane | ............. | F16L 1/028 |
| | | | | 405/184 |
| 2020/0032598 A1* | 1/2020 | Kysely | ............. | E21B 21/00 |

* cited by examiner

SCHEME USED FOR THE VENTURI EFFECT CALCULATION.

1-HIGH PRESSURE PIPE WITH 1000 l/MIN AT 80 BARS. IN THE 400 MM PIPE THERE CAN BE 1-3 SUCH PIPES.

A1-ANNULUS ARIA BETWEEN THE 400 MM PIPE AND THE MUD MOTOR=0.05495 M$^2$

A2-COMBINED AREA OF THE HIGH PRESSURE PIPES=0.027475 M2

Q1-FLOW IN THE HIGH PRESSURE PIPE=1000 l/MIN

Q2-COMBINED FLOW AT THE FACE=2000 l/MIN

CALCULATING THE VELOCITY OF DRILLING FLUID AT SECTION A $$V1 = \frac{Q1}{A1} = \frac{1000 \, l/MIN}{0.18317 \, M2} = \frac{1 M3/MIN}{0.18317 \, M2} = 54.59 \, M/MIN$$

CALCULATING THE VELOCITY OF DRILLING FLUID $$V2 = \frac{Q2}{A2} = \frac{2000 \, l/MIN}{0.05495 \, M2} = \frac{2 M3/MIN}{0.05495 \, M2} = 36.40 \, M/MIN$$

FOR HORIZONTAL FLOW THE FOLLOWING EQUATION CAN BE USED FOR PRELIMINARY CALCULATION:

$$P1-P2 = \frac{P(V1-V2)}{2} = \frac{1000(54.59-36.40)}{2} = 89 \, KPA$$

FIG. 12

TRENCHLESS PIPELINE INSTALLATION SYSTEM

CROSS REFERENCE TO RELATED APPLICATIONS

The following application is a based on and claims the priority benefit of U.S. provisional application Ser. No. 62/858,061 filed on Jun. 6, 2019; the entire content of which is incorporated by reference.

BACKGROUND OF THE INVENTION

A trenchless pipeline installation system and method is provided. The system and method may utilize a venturi pipe system located behind a drill bit and a pipe pushing device to help pull a pipe/cable underground in a continuous one-step process. The system and method combine a pipe casing, venturi system, mud motor and drill bit in a single, compressed system with a small diameter. The system and method are especially suitable for allowing a one-step installation of smaller-diameter pipe or cable line under, for example, rivers, hills, ravines, roads, railroads, streets, agricultural and residential areas.

Underground direction drilling systems have been around for a while. For example, U.S. Pat. No. 7,367,748 to Groebner discloses a method of installing a non-metallic pipeline segment along with a tracer wire segment using a horizontal directional drilling process includes positioning a horizontal directional drilling machine in a selected position on one side of the obstacle. A drill bit is attached to an end of a flexible steel pipe. The flexible steel pipe engages and is driven by the horizontal directional drilling machine that forces the drill bit and the flexible pipe from the first side of the obstacle to a second side of the obstacle thereby drilling a bore underneath the obstacle. The drill bit is removed and a reamer is attached to the end of the flexible pipe. An end of a pipeline segment along with an end of a tracer wire segment having a high carbon steel core and a copper cladding with a high density polyethylene jacket is attached to the reamer. The drive of the horizontal directional drilling machine is reversed such that the reamer pulls the pipeline and the tracer wire back through the bore beneath the obstacle such that an end of the segment of the pipeline and an end of the segment of the tracer wire extends beyond the first surface of the obstacle.

Further, U.S. Pat. No. 4,951,758 to Sonku discloses a method of drilling apertures for branch lines (A) blocked by renovation lining of a main pipeline (B) which comprises setting a water plug (1) in the opening of each branch line (A) prior to lining, said water plug (1) carrying a position marker (14) comprising an antenna coil and a resonator adapted to be excited by a driving signal and, after stoppage of the driving signal, release a resonance signal remaining in the resonator from the antenna coil and said position marker being situated in a position which, upon setting of the water plug (1) in position, is substantially concentric with the axis of the branch line (A), causing an antenna assembly for detecting the resonance signal to travel within the main pipeline (B) to detect the position of the marker (14) and driving a drilling means (24) using the thus-detected marker position as a target from within the main pipeline.

However, these patents fail to describe a trenchless pipeline installation system and method which are easy to use for small diameters. Further, these patents fail to provide for a trenchless pipeline installations system and method which allows for the quick installation of a pipe in a one-step process.

SUMMARY OF THE INVENTION

A trenchless pipeline installation system and method is provided. The system may utilize a venturi pipe system located behind a drill bit and a pipe pushing device to help pull a pipe/cable underground in a continuous one-step process. The system and method combine a pipe casing, venturi system, mud motor and drill bit in a single, compressed system with a small diameter. The system and method are especially suitable for allowing a one-step installation of smaller-diameter pipe or cable line under, for example, rivers, hills, ravines, roads, railroads, streets, agricultural and residential areas.

An advantage of the present trenchless pipeline installation system and method are that the present system and method may be a continuous one-step process system for installing a pipe underground.

And another advantage of the present trenchless pipeline installation system and method are that the present system and method may be used for the controlled directional installation of a preliminarily welded pipe or cable line of steel or HDPE underground without preliminary a pilot hole.

Still another advantage of the present trenchless pipeline installation system and method are that the present system and method may have a special drill bit on the face of a hydro-vacuum drilling machine.

Yet another advantage of the present trenchless pipeline installation system and method are that the present system and method uses a pressure balanced hydro-vacuum system.

For a more complete understanding of the above listed features and advantages of the trenchless pipeline installation system and method reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A trenchless pipeline installation system and method is provided. The system may utilize a venturi pipe system located behind a drill bit and a pipe pushing device to help pull a pipe/cable underground in a continuous one-step process. The system and method combine a pipe casing, venturi system, mud motor and drill bit in a single, compressed system with a small diameter. The system and method are especially suitable for allowing a one-step installation of smaller-diameter pipe or cable line under, for example, rivers, hills, ravines, roads, railroads, streets, agricultural and residential areas.

Figure 1:
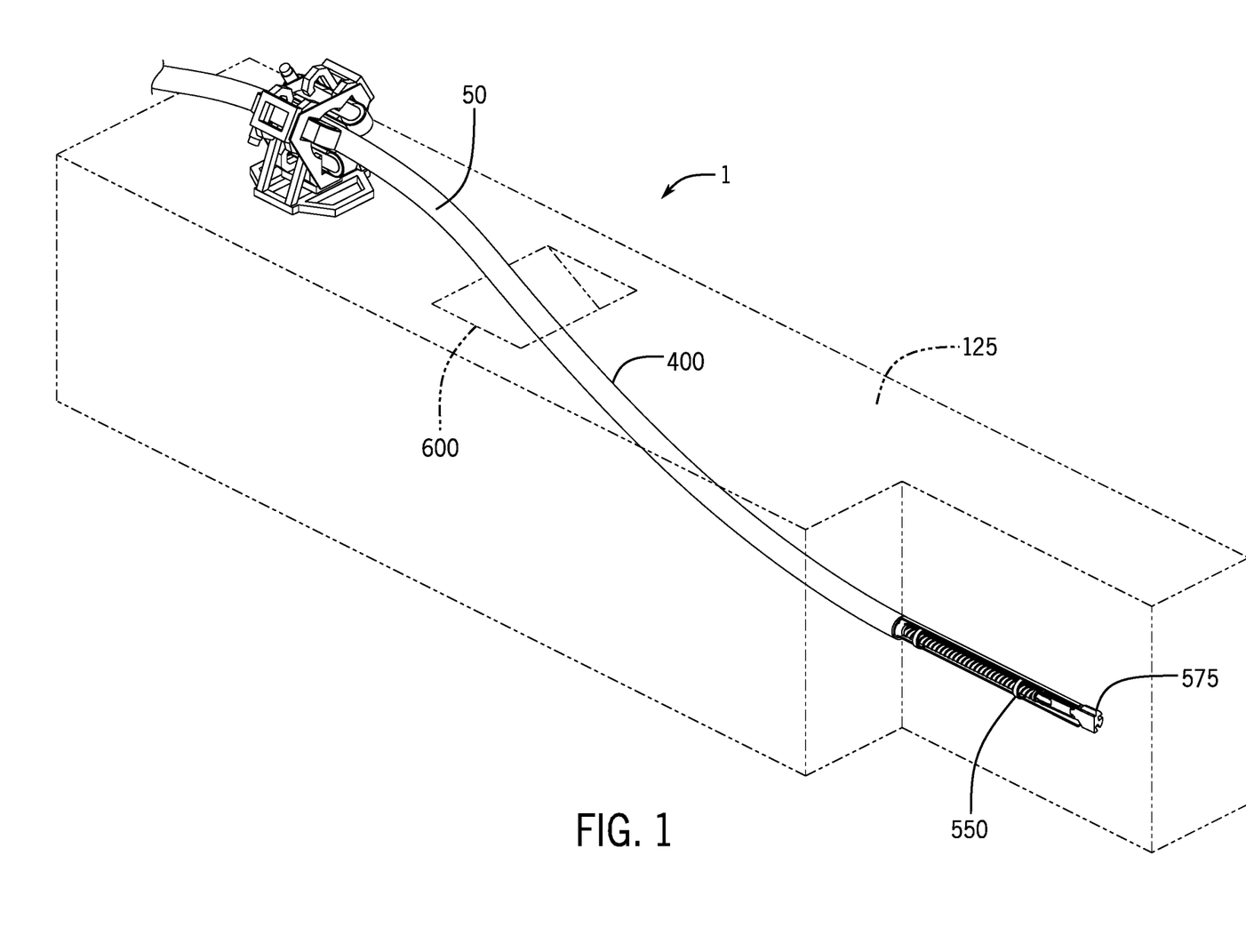
FIG. 1 illustrates a perspective view of the trenchless pipeline installation system located partially above ground and partially below ground during use in one embodiment.

Referring first to FIG. 1, a trenchless pipeline installation system and method 1 are provided. The system 1 may provide a continuous, one-step process of installing a preliminarily welded pipe or cable line 50 of, for example, steel or HDE, underground without the need to have preliminarily directionally way pilot holes drilled. The system 1 is especially suitable for easily removing slurry 100 (FIG. 11) from the ground 125 (FIG. 1) and installing a pipe or cable 50 underground.

Figure 2:
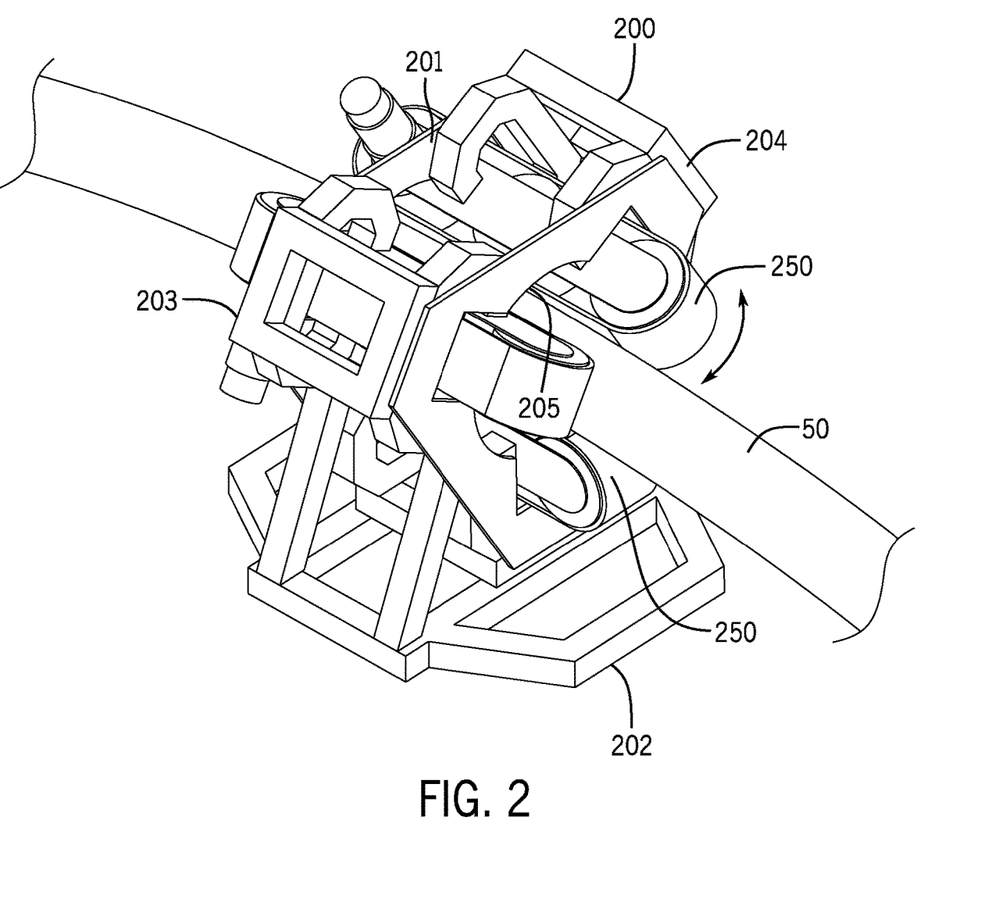
FIG. 2 illustrates a perspective view of the pipe pushing device (or 'floating frame') and pushing tracks surrounding the cable or pipeline to be installed.

In an embodiment, the system 1 may have a pipe pushing frame 200 (FIGS. 1 and 2). In one embodiment, the pushing frame 200 is triangular, having a top 201, a bottom 202, a first side 203, a second side 204 and a central interior opening 205 which receives the pipe or cable line 50. The pipe pushing frame 200 may have a plurality of wheels 250 which pull (or push) the pipe 50 underground 125 into an opening 600 in the ground and then through an underground tunnel 400 (FIG. 11) created by the system 1 (as discussed later). Although the figures illustrate three wheels 250 being used to pull (or push) the pipe or cable line 50, the pipe pushing frame 200 may have a greater or fewer number of wheels 250. The wheels 250 may directly contact the pipe or cable 50. When a power source is introduced to the wheels 250, the wheels 250 rotate (generally in unison) and therein pull (or push) the pipe or cable line 50 within the tunnel 400 which is created by a drill at the head of the system 1. In an embodiment, the pipe 50 is made of steel. The pipe pushing frame 200 is generally located above ground, just outside of the first opening 600 (FIG. 1) of the tunnel 400 created by the system 1.

Figure 3:
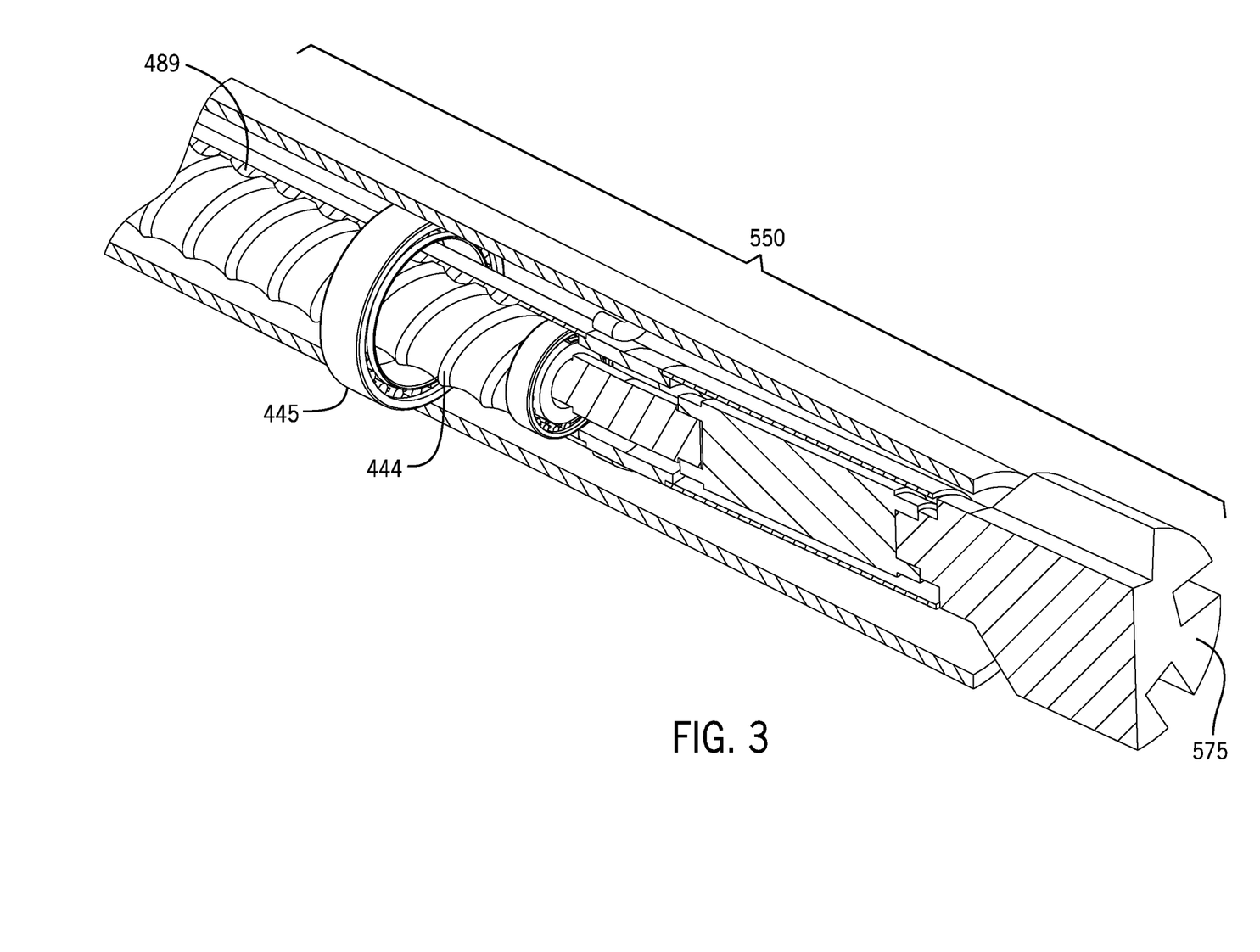
FIG. 3 illustrates a perspective view of the front end (or 'head') of the present drilling system in an embodiment.
Figure 4:
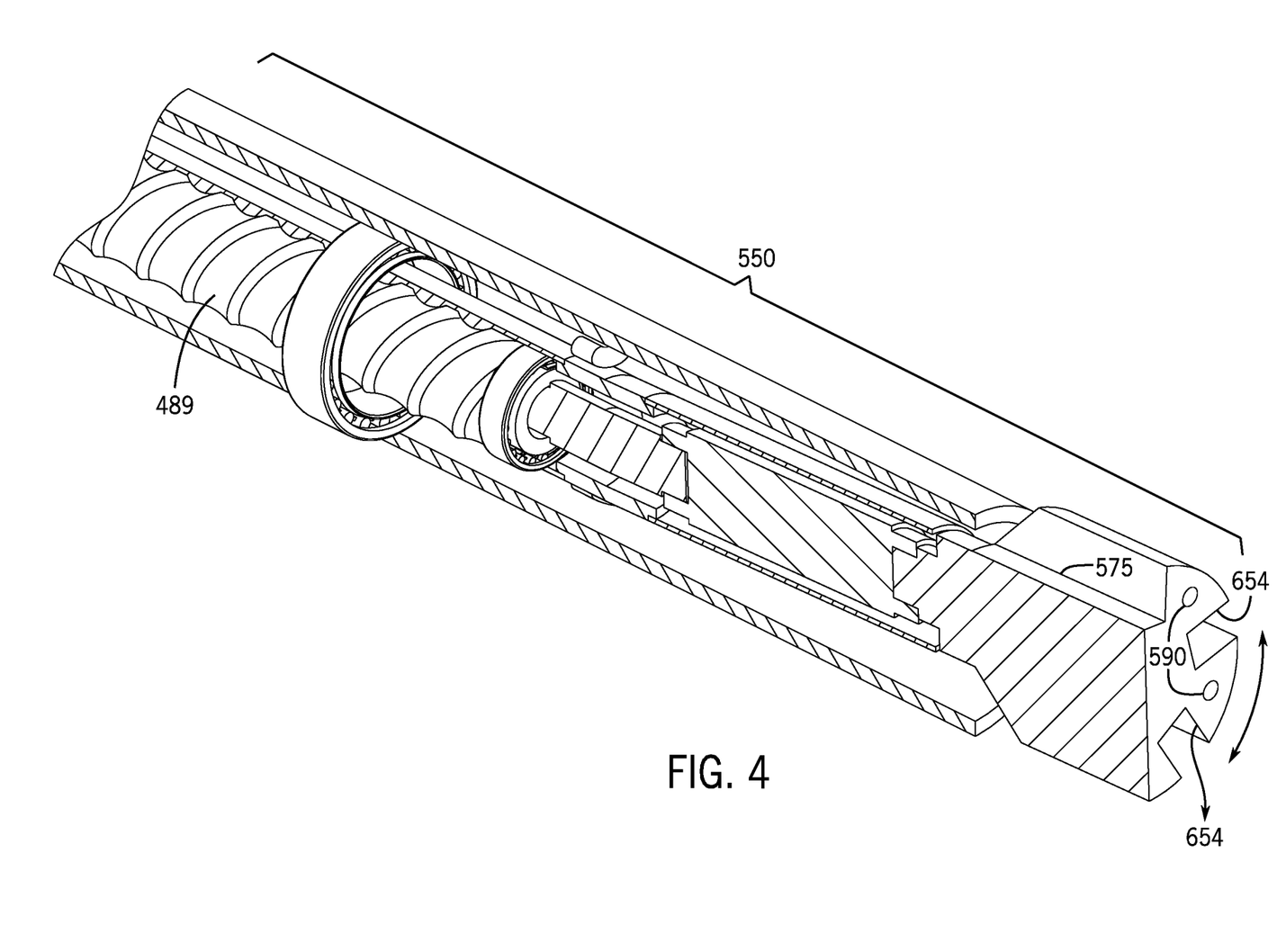
FIG. 4 illustrates a perspective view of the front end (or 'head') of the present drilling system in an embodiment.
Figure 5:
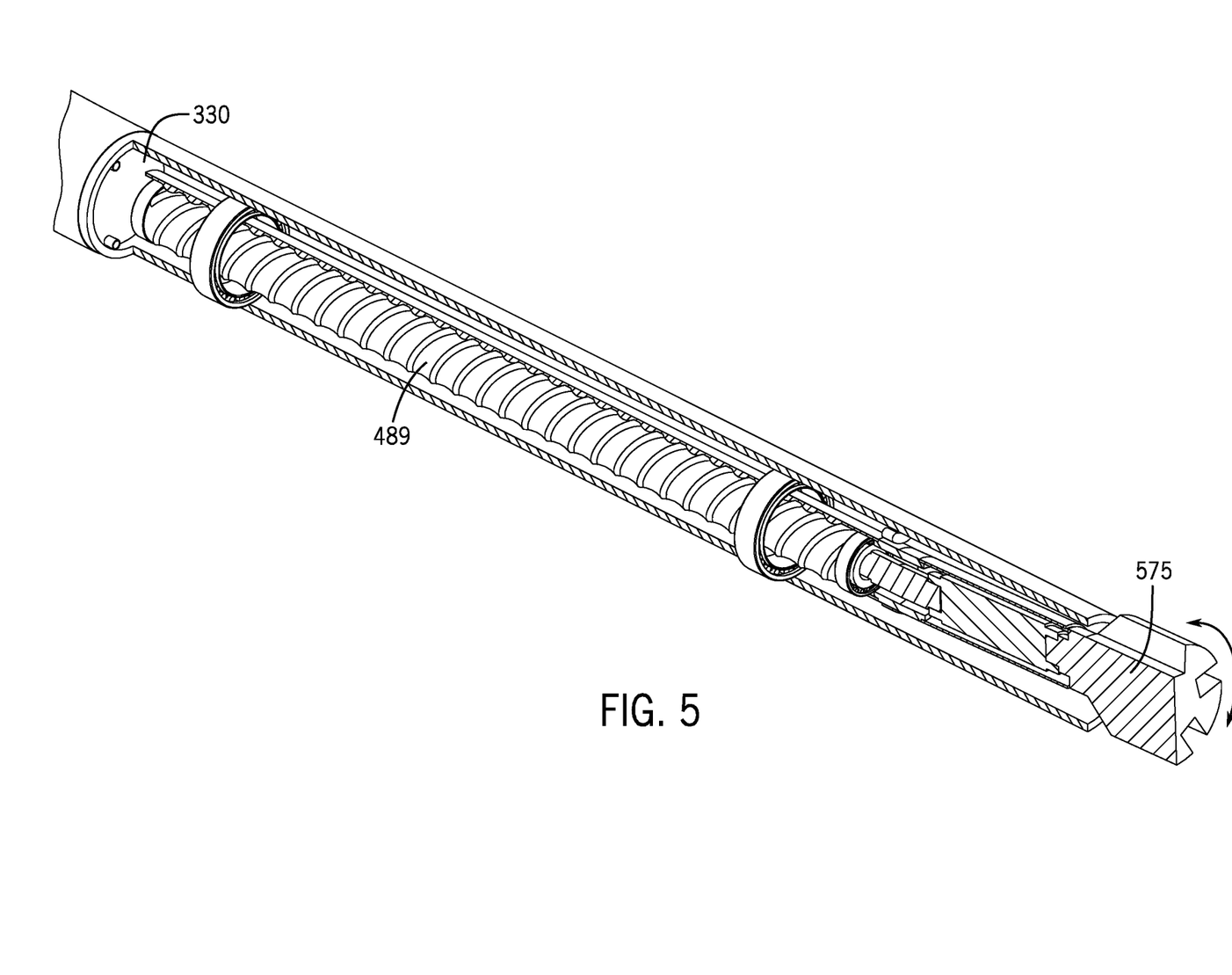
FIG. 5 illustrates a perspective view of the front end (or 'head') of the present drilling system in an embodiment wherein the system has a navigational system incorporated.
Figure 6:
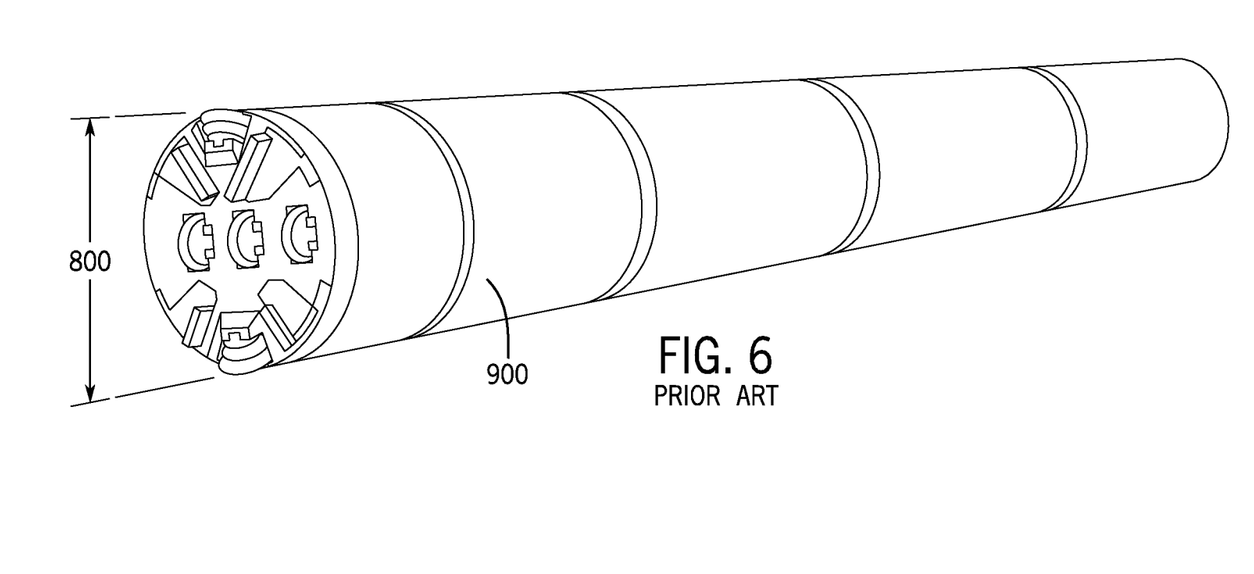
FIG. 6 illustrates a perspective of a large direct pipe machine in prior art drilling machines.
Figure 7:
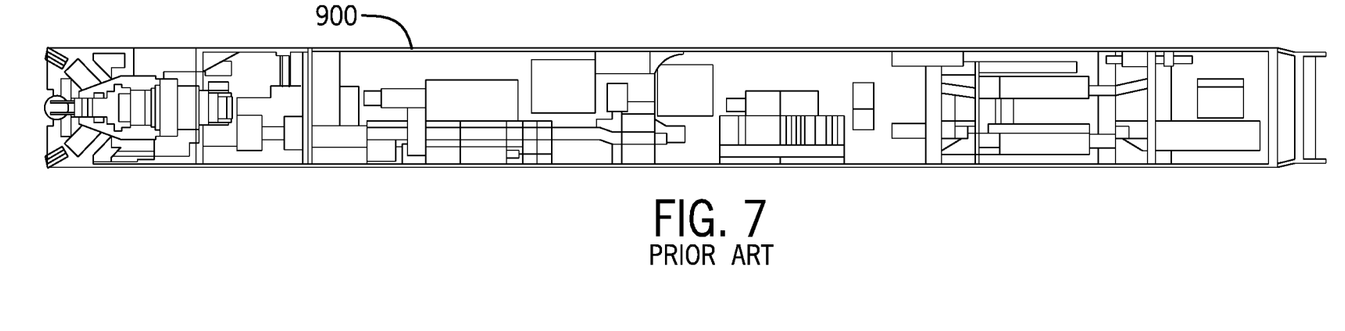
FIG. 7 illustrates a cross sectional view of prior art drilling machines.
Figure 8:
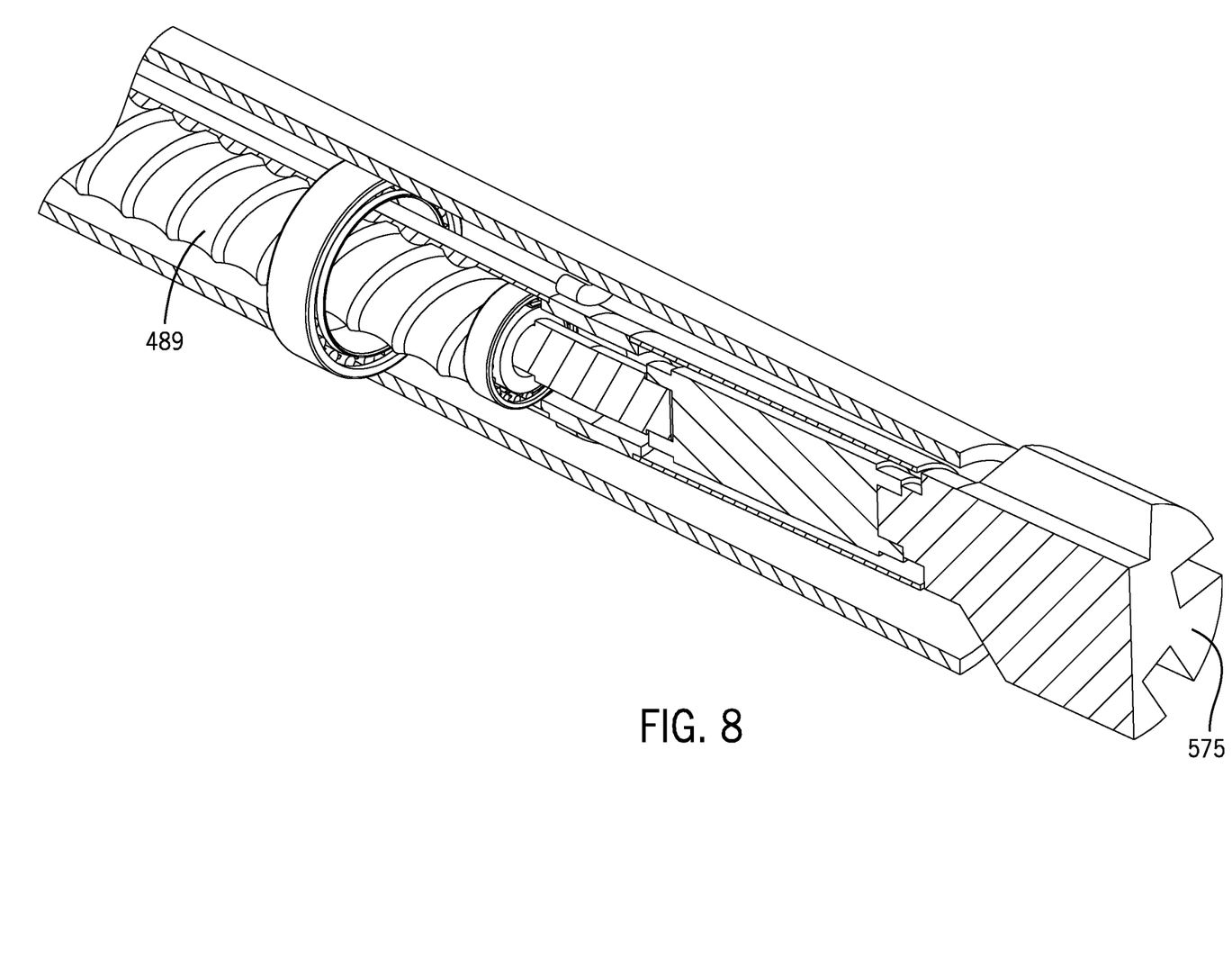
FIG. 8 illustrates a perspective view of the front end (or 'head') of the present drilling system in an embodiment
Figure 9:
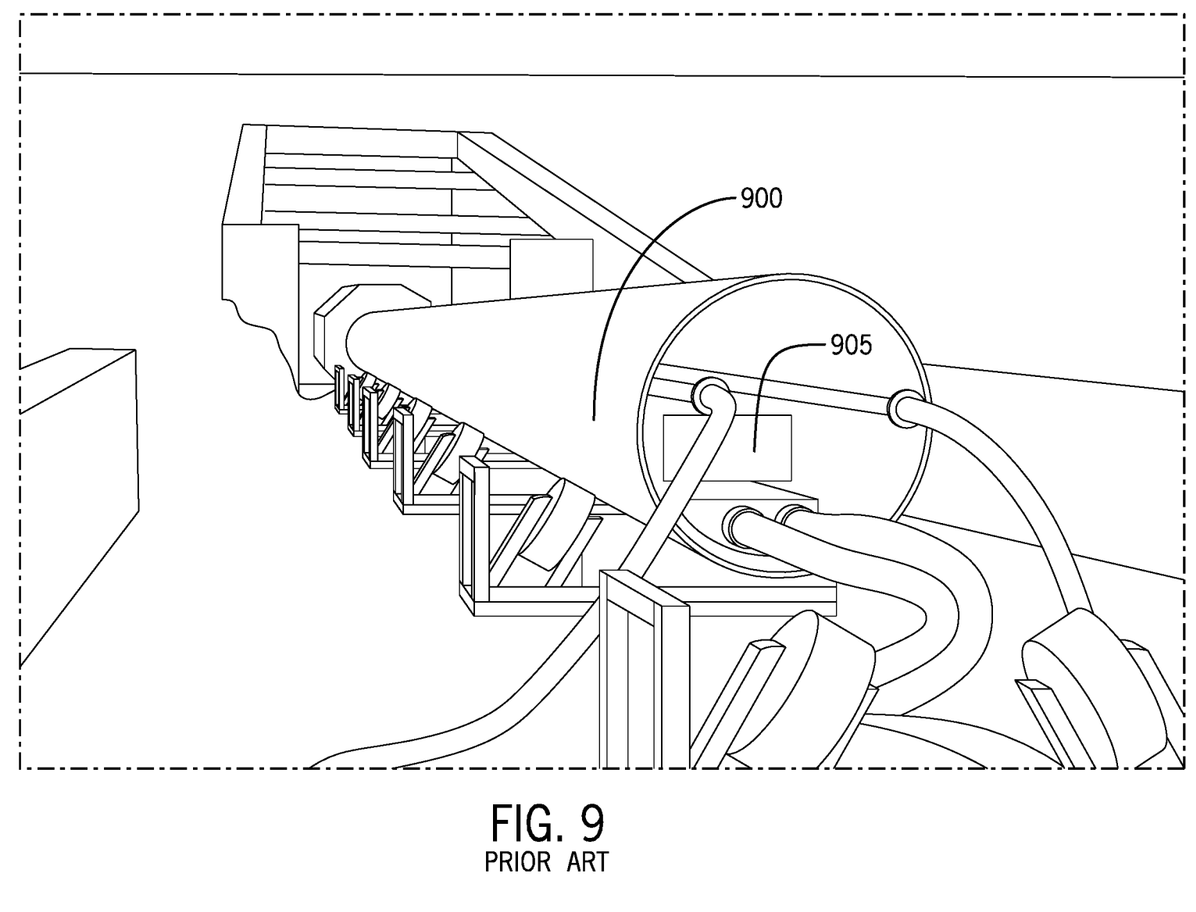
FIG. 9 illustrates a perspective view of a prior art large pipe drilling machines wherein the interior of the pipe (and power source) are visible.
Figure 10:
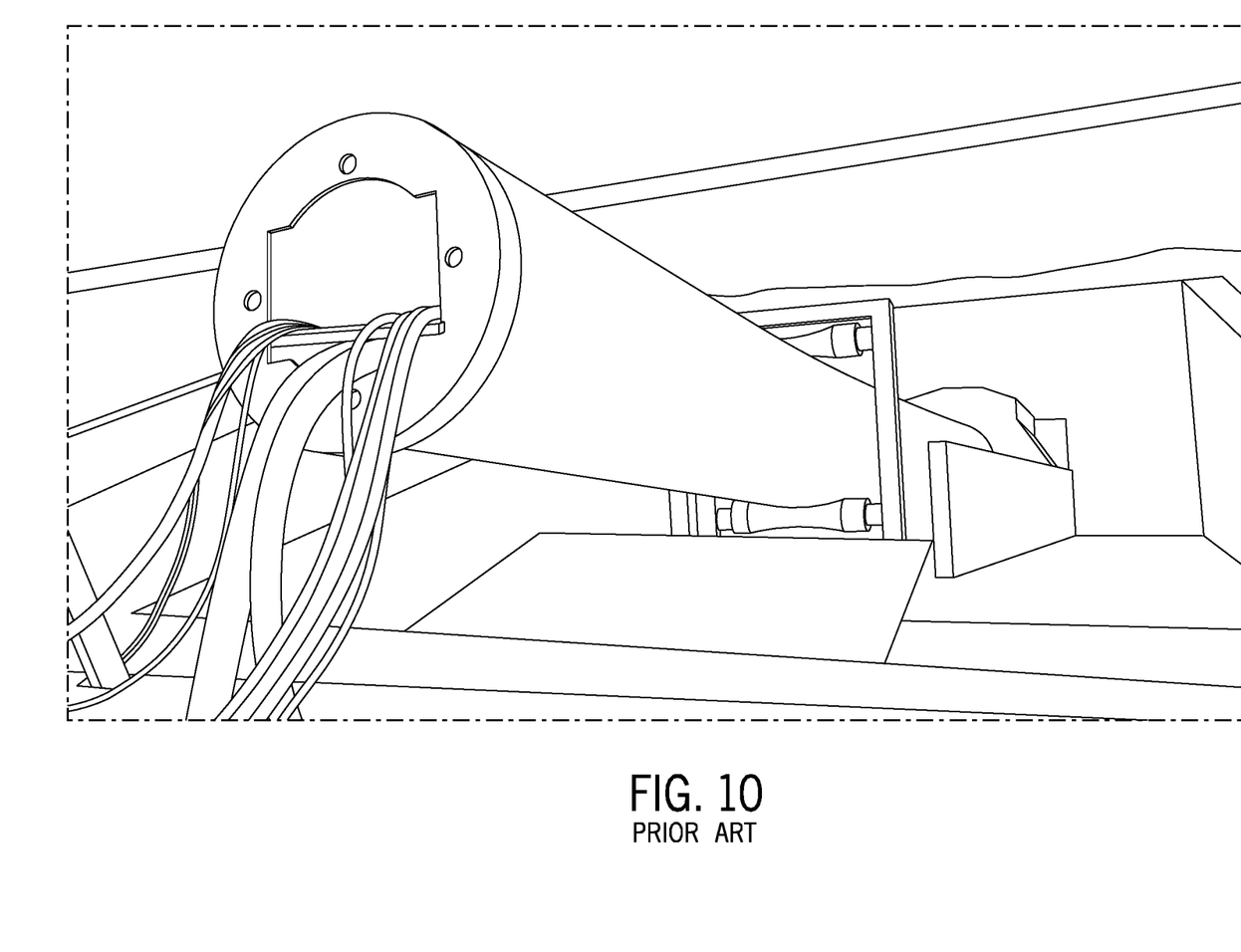
FIG. 10 illustrates a perspective view of prior art large pipe drilling machines.

In an embodiment, the system 1 may have a first end 550 (as best illustrated in FIG. 4). The first end 550 of the system 1 may be the 'business end' of the system 1 and may be the portion of the system 1 that has the drill bit surface 575 (as described below). The first end 550 of the system 1 may also have a mud motor 444 (FIG. 3). The mud motor 444 may be the device, which communicates torque to rotate the drill bit surface 575 using the flow of drilling fluid between a steel casing and a spiral bent shaft. Further, the first end 550 of the system 1 may have friction bearings 445 which hold the mud motor inside the pipe 50 and may allow the mud motor to rotate within the pipe 50. In an embodiment, the system 1 may also have an optional navigational system 330 (FIG. 5). The optional navigational system 330 may allow the installation of the pipe or cable 50 to be properly controlled underground 125. Referring now to FIG. 3, in an embodiment, a sleeve 489 is present. The sleeve 489 may surround the mud motor 444.

Figure 11:
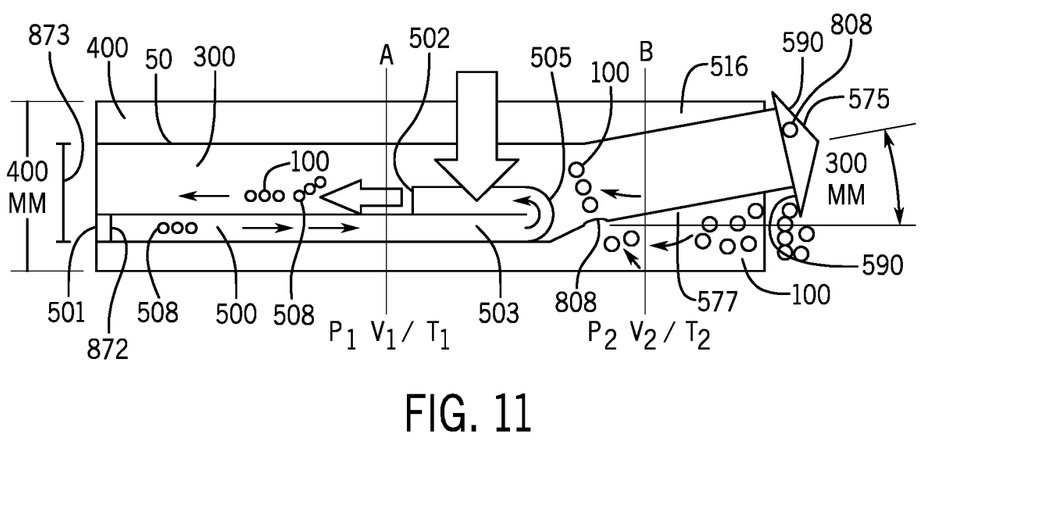
FIG. 11 illustrates a diagram of the front of the venturi pipe system in the present drilling system.

The pipe or cable line 50 is inserted into the tunnel 400 while the tunnel 400 is concurrently created by the drill bit 575 of the system 1. In an embodiment, the pipe or cable line 50 of the system 1 may have an interior 300 (FIG. 11). Within the interior 300 of the pipe or cable 50 may (temporarily) be a second pipe 500. The second pipe 500 may have a first opening 501, a second opening 502 and an interior 503. The first opening 501 of the second pipe 500 may be connected to, for example, a reservoir (not shown) which houses high pressure air 508 (or a compressed other fluid or gas). The second pipe 500 may have a generally one hundred and eighty degree bend 505 so that the second opening 502 of the second pipe 500 faces in a direction that so that the compressed air or gas 508 essentially exits the second pipe 500 flowing in the direct opposite direction as the flow of the compressed air 508 predominately travels through the remainder of the second pipe 500.

Further, the second opening 502 may terminate within the interior of the main tube 50 and may face in a one hundred and eighty-degree (or substantially one hundred and eighty degree) direction with respect to the drill bit. As a result, a venturi vacuum is created and slurry 100 located within the tunnel 400 near the drill face 575 (or tip of the pipe or cable 50) gets pulled through the interior 300 of the main pipe or cable 50 toward the first opening 600 of the tunnel 400 (or opening in which the system 1 is first introduced into the ground). The slurry 100 may then be moved to an alternative location.

The pressurized air 508 and the slurry 100 may therefore both move together within the interior 300 of the main pipe 50 toward the opening 600. In one embodiment, holes 590 located on the nozzle or drill 575 face backwards (away from the drilling end of the drill bit). As a result, the holes 590 face the main pipe 50 so that the pressurized air 508 is expelled from the holes 590 toward the main pipe 50 so that the pressurized air 508 may more easily enter the main pipe 50 (with the slurry 100) through the opening 808 of the main pipe 50. It should be understood that in addition to or alternative to the pressurized air or gas exiting the second end 502 of the second tube 500, the pressurized gas or air may also exit the holes 590 of the drill bit 575 to force the slurry 100 of from underground.

In an embodiment, there is at least one hole 808 (but preferably more) on the main pipe 50 located at or near the drill bit 575 so that slurry 100 which is located around the front of the drill 575, once drilled, gets transported from within the tunnel 400 to the interior 300 of the main pipe 50.

As stated above, in an embodiment, the first end 550 of the system 1 may have a drill surface 575 (FIG. 4) having cutting edges 654 which rotate at a high speed. In an embodiment, the drill surface 575 is angled (preferably, slightly upward) at an angle of approximately between twenty and sixty degrees (see FIG. 11). The angled drill surface 575 creates a pressure variable between the space above 516 the drill surface 575 and the space below 577 the drill surface 575 Because the drill digs the tunnel 400 the pipe 50 is inserted into, the angled drill surface 575 actually makes the space above 516 smaller than the space below 577 the drill surface 575 and therein the present device 1 creates the pressure variable.

Because the drill surface 575 is angled (preferably upward) the space 516 above the drill surface 575 is less than the space 577 below the drill surface 575. A pressure differential is therefore created between the drill surface 575 and the tunnel walls 400 which allows the slurry 100 to more easily be introduced into the interior 300 of the pipe or cable line 50 and, therefore, forced via the venture pressure, out of the first opening 600 of the ground 125 where it can be relocated.

Figure 12:
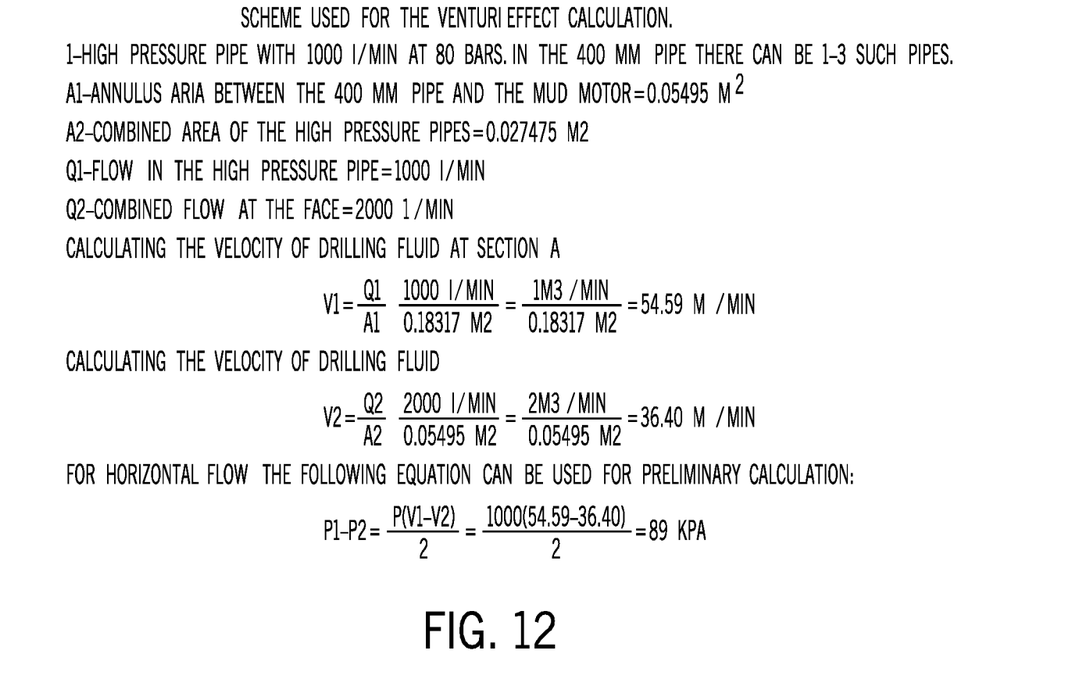
FIG. 12 illustrates equations for the pressure equilibrium for the present system.

FIG. 12 illustrates the mathematical equations of the pressure created by the system and method 1 to remove the slurry 100 from the tunnel created by the system and method 1. Positive pressure at the drill hole 590 face 575 is balanced against vacuum created by venturi system. Pressure in the zone inside the interior 300 of the pipe 50 behind the drill bit 575 is lower than the face 575 pressure, which brings the cuttings (and slurry 100) into the pipe interior 300 and not into the annular space. The venturi system of the pipe 50 therein increases the velocity of slurry 100 movement inside the interior 300 of the pipe 50 and ultimately out of the ground 125.

The novel and non-obvious use of the second (the 'interior') pipe 500 to create the venturi pressure within the interior 300 of the first pipe or cable 50 allows the slurry 100 to be removed in a quick and efficient manner. Prior art drilling machines (as shown in FIGS. 6, 7, 9 and 10) have large diameter tubes 900 require a much larger diameter 800 so that power packs 905 (FIG. 9) may be inserted into the tubes 900 to power the system. Because of the venturi vacuum of the present system 1, the need for internal power packs to power the drill surface 575 is eliminated and the overall diameter of the pipes or cable 50 may be substantially reduced to allow for small diameter drilling and installation.

In an embodiment, the second tube 500 has a diameter 872 which is less than a diameter 873 of the main tube 50 so that the second pipe 500 may be located within the main pipe 50. In an embodiment, the second tube 500 is located along an interior wall of the main pipe 50 (as shown in FIG. 11) so as to increase the flow of the slurry 100, although the location of the second tube 500 within the first tube 50 may be altered.

Finally, once the drill bit 575 completes drilling the underground tunnel 400 while at the same time pulling the pipe 50 underground, the second tube 500 may then be easily removed from the interior of the main pipe 50 (by pulling the second tube 500 out from within the larger main pipe 50) while leaving the main pipe 50 in place underground. As a result of the main pipe 50 being left underground while the interior second tube 500 is removed, the main pipe 50 may then be used for water, cables, utilities or other necessary means without the need to drill a second tunnel under ground as is commonly done in prior art drilling procedures. Therefore, the second tube 500 thus may move within the interior 300 of the main pipe 50 and independent of the main pipe 50.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A trenchless pipeline installation system comprising:
   a main tube having a first end, a second end and an interior having a diameter wherein the first end of the main tube is attached to a drill bit;
   a second tube located within the first tube wherein the second tube has a diameter which is smaller than the diameter of the main tube;
   an opening on the main tube at the first end of the main tube; and
   a u-shaped bend in the second tube wherein the u-shaped bend of the second tube has an opening facing in an opposing direction as the first end of the main tube.

2. The trenchless pipeline installation system of claim 1 further comprising
   an opening in the drill bit wherein the opening in the drill bit is capable of releasing a fluid passing through the interior of the main tube.

3. The trenchless pipeline installation system of claim 2 wherein the opening in the drill bit faces an opposing direction as a face of the drill bit.

4. The trenchless pipeline installation system of claim 1 further comprising a bend at the first end of the main tube.

5. The trenchless pipeline installation system of claim 4 wherein the bend at the first end of the main tube is at an angle of twenty and sixty degrees with respect to the main tube.

6. The trenchless pipeline installation system of claim 1 wherein the drill bit rotates and is capable of digging within the ground.

7. The trenchless pipeline installation system of claim 1 further comprising a fluid passing through the second tube located within the interior of the main tube.

8. The trenchless pipeline installation system of claim 1 further comprising:
   a pipe pushing apparatus for pushing the main tube.

9. The trenchless pipeline installation system of claim 1 wherein the second tube may move within the interior of the main tube and independent from the main tube.

10. A trenchless pipeline installation method comprising the steps of:
    providing a main tube having a first end, a second end and an interior having a diameter wherein the first end of the main tube is attached to a drill bit;
    providing a second tube located within the first tube wherein the second tube has a diameter which is smaller than the diameter of the main tube;
    providing an opening on the main tube at the first end of the main tube;
    providing a u-shaped bend in the second tube wherein the u-shaped bend of the second tube has an opening facing in an opposing direction as the first end of the main tube; and
    pumping a pressurized fluid into the second tube to create a venturi vacuum within the interior of the main tube.

11. The trenchless pipeline method of claim 10 further comprising the step of:
    providing an opening in the drill bit wherein the opening in the drill bit is capable of releasing a fluid passing through the interior of the main tube.

12. The trenchless pipeline method of claim 10 wherein the opening in the drill bit faces an opposing direction as a face of the drill bit.

13. The trenchless pipeline method of claim 10 further comprising the step of:
    providing a bend at the first end of the main tube.

14. The trenchless pipeline method of claim 10 wherein the bend at the first end of the main tube is at an angle of twenty and sixty degrees with respect to the main tube.

15. The trenchless pipeline method of claim 10 wherein the drill bit rotates and is capable of digging within the ground.

16. The trenchless pipeline method of claim 10 further comprising the step of:
    providing a pipe pushing apparatus for pushing the main tube.

17. The trenchless pipeline method of claim 10 further comprising the step of:

removing the second tube from within the interior of the main tube after drilling is complete.

18. The trenchless pipeline method of claim 10 wherein the second tube may move within the interior of the main tube and independent from the main tube.

\* \* \* \* \*